(12) United States Patent
Abhishek (10) Patent No.: US 11,068,878 B2
(45) Date of Patent: Jul. 20, 2021

(54) SYSTEM AND METHOD FOR DATA COMMUNICATION BETWEEN COMPUTING DEVICES USING AUDIO SIGNALS

(71) Applicant: NAFFA INNOVATIONS PRIVATE LIMITED, Bangalore (IN)

(72) Inventor: Kumar Abhishek, Bokaro Steel (IN)

(73) Assignee: NAFFA INNOVATIONS PRIVATE LIMITED, Bangalore (IN)

( * ) Notice: Subject to any disclaimer, the term of this patent is extended or adjusted under 35 U.S.C. 154(b) by 156 days.

(21) Appl. No.: 15/743,000

(22) PCT Filed: Oct. 27, 2015

(86) PCT No.: PCT/IN2015/000400
§ 371 (c)(1),
(2) Date: Jan. 9, 2018

(87) PCT Pub. No.: WO2017/006336
PCT Pub. Date: Jan. 12, 2017

(65) Prior Publication Data
US 2018/0225655 A1   Aug. 9, 2018

(30) Foreign Application Priority Data
Jul. 9, 2015 (IN) .............................. 748/KOL/2015

(51) Int. Cl.
*G06Q 20/02*      (2012.01)
*G06Q 20/32*      (2012.01)
*G06F 16/18*      (2019.01)
*G06Q 20/38*      (2012.01)
(Continued)

(52) U.S. Cl.
CPC ..... *G06Q 20/3272* (2013.01); *G06F 16/1865* (2019.01); *G06Q 20/02* (2013.01); *G06Q 20/3823* (2013.01); *H04L 9/088* (2013.01); *H04M 1/72412* (2021.01)

(58) Field of Classification Search
None
See application file for complete search history.

(56) References Cited

U.S. PATENT DOCUMENTS

7,119,659 B2 * 10/2006 Bonalle ................. G06Q 20/10
                                                          340/5.61
9,398,131 B2 *  7/2016 Siegel ................. H04M 1/7253
(Continued)

*Primary Examiner* — Joseph W. King
*Assistant Examiner* — Amit Patel
(74) *Attorney, Agent, or Firm* — Barry Choobin; Patent 360LLC (57) ABSTRACT

The embodiments herein provide a method and system for establishing data communication through a secure channel using audio signals. The method comprises registering a plurality of users to an application, initiating the application by a registered user, emitting audio signals using the audio signal emitter to establish a secure channel with the other participating device, receiving audio signals from the other participating device, validating the other participating device using a validating module, detecting the proximity of the other participating device using a proximity detector, establishing a secure channel between the participating devices, wherein the secure channel is established using audio channels, and enabling financial transaction between the participating devices.

3 Claims, 4 Drawing Sheets

(51) Int. Cl.
*H04L 9/08* (2006.01)
*H04M 1/72412* (2021.01)

(56) References Cited

U.S. PATENT DOCUMENTS

2007/0022058 A1* 1/2007 Labrou .................. G06Q 20/32
705/67
2012/0214409 A1* 8/2012 Tzoreff ............... H04M 1/6008
455/41.1
2014/0129231 A1* 5/2014 Herring .................. G10L 25/51
704/270.1

* cited by examiner

SYSTEM AND METHOD FOR DATA COMMUNICATION BETWEEN COMPUTING DEVICES USING AUDIO SIGNALS

CROSS-REFERENCE TO RELATED APPLICATIONS

The embodiments herein claim the priority of an Indian Non-Provisional Patent Application (NPA) with the serial number 748/KOL/2015 filed on Jul. 9, 2015 and entitled, "A SYSTEM AND METHOD FOR. DATA COMMUNICATION BETWEEN COMPUTING DEVICES USING AUDIO SIGNALS" and the contents of which are included entirely as reference herein. The present application is a national phase application of the Patent Cooperation Treaty (PCT) application with the number PCT/IN2015/000400 filed on Oct. 27, 2015.

BACKGROUND

Technical Field

The embodiments herein are generally related to data transmission between computing devices. The embodiments herein are particularly related to a data transmission between computing devices through wireless signals. The embodiments herein are more particularly related to data transmission between a plurality of participating computing devices using audio signals.

Description of the Related Art

A data transmission between a plurality of devices is an integral part in all communication systems. A data is transferred through several wired and wireless technologies, such as GPRS, Wi-Fi, Bluetooth, and the like. While some of the wireless technologies enable data transfer over long ranges, a data needs to be transferred in many instances between the devices that are in close proximity.

The data transmission between the devices that are in close proximity is enabled using wireless technologies. However, in many cases, a device such as a feature phone might not have access to such technologies, or the user is not interested in using such technologies. Hence, several attempts have been made to enable a data transmission between the devices that are in close proximity with less complexity. One such technique used for the transmission of data between the devices that are in close proximity is through audio signals.

In the conventional technique of transferring data through audio signals, an audio signal is generated by encoding the data to be transferred. The audio signal is played by a device and the audio signal is received by a microphone of a receiving device. The received audio file is decoded and the data is extracted. Several drawbacks have been observed in the conventional technique.

One such drawback relates to difficulties in accurately decoding the audio file. For example, when the audio file is played in a noisy environment, difficulties persist in differentiating the audio file from the noise, which adversely affects decoding efficiency.

Another drawback relates to misuse of the audio file. For example, when an audio file is played, an unauthorized device can receive the audio file and use it for malicious purposes. Yet another drawback relates to specific hardware prerequisite of the device playing the audio file to enable effective decoding of the audio file The above-mentioned shortcomings, disadvantages and problems are addressed herein and which will be understood by reading and studying, the following specification.

OBJECTS OF THE EMBODIMENTS HEREIN

The primary objective of the embodiments herein is to provide a method and system to transfer data between a plurality of computing devices using audio signals.

Another objective of the embodiment herein is to provide a system and method for implementing financial transaction between the plurality of computing devices using audio signals.

Yet another objective of the embodiments herein is to establish a secure channel between the plurality of computing devices for audio transfer.

Yet another objective of the embodiments herein is to determine the proximity between the plurality of devices to enable a data transfer using audio signals.

Yet another objective of the embodiments herein is to set a threshold for enabling a transfer between the plurality of devices using audio signals.

Yet another objective of the embodiments herein is to select a specific set of frequencies based on the proximity level detected, for enabling a data transfer using the audio signals.

Yet another objective of the embodiments herein is to intelligently detect a type of the participating devices, for enabling a data transfer using audio signals.

These and other objects and advantages of the embodiments herein will become readily apparent from the following detailed description taken in conjunction with the accompanying drawings.

SUMMARY

The embodiments herein provide a system and method for a secure data transfer between a plurality of participating devices through audio signals. The system comprises an application server, a plurality of participating devices hosting an application for enabling financial transaction, and a communication network.

According to an embodiment herein, the plurality of the participating devices are registered to the application server through an application hosted on the plurality of the participating devices.

According to an embodiment herein, a communication network is provided to establish a communication between the application server and the plurality of the participating devices registered on the application network.

According to an embodiment herein, the system is configured to execute a financial transaction between the plurality of participating devices.

According to an embodiment herein, the application server comprises a registration module, a user database, a validating module, a transaction database, an auxiliary module, and an analytics module.

According to an embodiment herein, the registration module is configured for registering a plurality of users through the application.

According to an embodiment herein, the user database stores the information related to the plurality of users. The information related to the plurality of users include a user identity, a participating device identity, an identity of hardware parts of the device, a frequency of the transmission and reception of a participating device, a location of the participating device, currency used in the location, an information related to third party services, services subscribed, and an account information.

According to an embodiment herein, the validating module is configured to validate the users, and the users are validated either by a native application or by a third-party application.

According to an embodiment herein, the transaction database is communicatively connected to the validating module. The transaction database is configured to track the transactions or financial transactions made by the users through the application hosted on the user device.

According to an embodiment herein, the auxiliary module is communicatively coupled to the transaction database. The auxiliary module supports the plurality of devices and the types of support include a technology support, providing updates, providing interoperability, providing reconciliation, providing security patches, and replying to a plurality of queries.

According to an embodiment herein, the analytics module is communicatively coupled with the auxiliary module, transaction database, and user database to analyze the plurality of the transactions and user behavior.

According to an embodiment herein, the plurality of the participating devices hosting the application comprises an audio signal emitter configured for emitting audio signals in anti-duplication frequencies, an audio signal receiver communicatively coupled with the audio signal emitter for receiving audio signals from other participating device, a proximity detector communicatively coupled with the audio signal receiver for detecting the proximity level of the other participating devices, a frequency of the signal received, and a quality of the hardware, a frequency selector communicatively coupled with the proximity detector for selecting a set of frequencies based on the proximity level detected by the proximity detector, and a private key decryptor for decrypting the information in the data transacted between the participating devices.

According to an embodiment herein, the audio signal emitted include the transaction details, and the information about payload data.

According to an embodiment herein, the anti-duplication frequencies are either audible frequencies or inaudible frequencies. Further, the anti-duplication frequencies are the frequencies that are different from the frequencies used for transmitting the payload data.

According to an embodiment herein, the audio signals are emitted for establishing a secure channel for executing a financial transaction.

According to an embodiment herein, one set of the frequency is selected from a 32 sets of frequencies provided by the application for transmitting and receiving the audio signals, and the frequencies are selected based on the use case scenarios and machine learning algorithm used.

The various embodiments herein provide a method for establishing a data communication through a secure channel using audio signals. According to an embodiment herein, the method comprising the steps of registering a plurality of users to an application server, initiating the application by a registered user, emitting audio signals in anti-duplication frequencies using the audio signal emitter to establish a secure channel with the other participating devices, receiving audio signals from the other participating devices, validating the other participating device using a validating module, detecting the proximity of the other participating device using a proximity detector, establishing a secure channel between the participating devices, and enabling financial transaction between the participating devices.

According to an embodiment herein, a step of registering, the plurality of users to the application include receiving user name, user identity, user password, device identity, location details, currency of the location, and access to third-party information, and the plurality of users are registered through a registration module.

According to an embodiment herein, the user details are stored in a user database.

According to an embodiment herein, the application is initiated using the participating device that is hosting the application, and initiating the application refers to the user entering the transaction details.

According to an embodiment herein, the audio signals emitted are anti-duplication signals and the audio signals are emitted in anti-duplication frequencies. According to an embodiment herein, the audio signals are emitted in the range of 0-32,000 dB According to an embodiment herein, the received audio signals are in anti-duplication frequencies, and the received audio signals include the transaction data, payload data, and the hardware information about the other participating device. According to an embodiment herein, the audio signals are received when the distance between the emitting device and the receiving device is equal to or less than ten meters.

According to an embodiment herein, the validating module is configured to validate the participating device using a native application or a third party application.

According to an embodiment herein, the proximity detector is configured to determine the distance between the participating devices involved in the financial transaction. According to an embodiment herein, the proximity is detected when the distance between the emitting device and the receiving device is equal to or less than ten meters.

According to an embodiment herein, the financial transaction is enabled by transmitting the payload data in the secure channel and the payload data is transmitted using the audio signal.

According to an embodiment herein, the participating users are notified after the establishment of the financial transaction.

According to an embodiment herein, the participating device is selected from a group consisting of mobile phones, smart phones, desktop computers, laptop computers, virtual reality devices, palmtop computers, wearable devices, and point of sale (POS) devices.

According to an embodiment herein, the application is run in the background and manage the transmitting and receiving capabilities of the participating device.

According to an embodiment herein, when the user brings the first participating device near to the participating device receiving the payment (POS machine), the application is activated automatically for sending the payment instruction on the first participating device, allowing an invisible payment experience for the users.

According to an embodiment herein, a notification is pushed to a third-party server for completing the transaction, when the second participating device receives a payload data from the first participating device through the secure audio channel. The examples of the third-party server include, but are not limited to a remote server, a financial institution linked to the first participating device, a financial institution linked to the second participating device, an independent third-party financial institution, and the like.

These and other aspects of the embodiments herein will be better appreciated and understood when considered in conjunction with the following description and the accompanying drawings. It should be understood, however, that the following descriptions, while indicating the preferred embodiments and numerous specific details thereof; are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment, and the accompanying drawings in which.

Although the specific features of the embodiments herein a shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, reference is made to the accompanying drawing that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide as system and method for enabling data communication between devices through audio signals.

According to an embodiment herein, a system is provided for a secure data transfer between a plurality of participating devices through audio signals. The system comprises an application server, a plurality of participating devices hosting an application for enabling financial transaction, and a communication network.

According to an embodiment herein, the plurality of the participating devices are registered to the application server through an application hosted on the plurality of the participating devices.

According to an embodiment herein, a communication network is provided to establish a communication between the application server and the plurality of the participating devices registered on the application network.

According to an embodiment herein, the system is configured to execute a financial transaction between the plurality of participating devices.

According to an embodiment herein, the application server comprises a registration module, a user database, a validating module, a transaction database, an auxiliary module, and an analytics module.

According to an embodiment herein, the registration module is configured for registering a plurality of users through the application.

According to an embodiment herein, the user database stores the information related to the plurality of users. The information related to the plurality of users include a user identity, a participating device identity, an identity of hardware parts of the device, a frequency of the transmission and reception of a participating device, a location of the participating device, currency used in the location, an information related to third patty services, services subscribed, and an account information.

According to an embodiment herein, the validating module is configured to validate the users, and the users are validated either by a native application or by a third-party application.

According to an embodiment herein, the transaction database is communicatively connected to the validating module. The transaction database is configured to track the transactions or financial transactions made by the users through the application hosted on the user device.

According to an embodiment herein, the auxiliary module is communicatively coupled to the transaction database. The auxiliary module supports the plurality of devices and the types of support include a technology support, providing updates, and replying to a plurality of queries.

According to an embodiment herein, the analytics module is communicatively coupled with the auxiliary module, transaction database, and user database to analyze the plurality of the transactions and user behavior.

According to an embodiment herein, the plurality of the participating devices hosting the application comprises an audio signal emitter configured for emitting audio signals in anti-duplication frequencies, an audio signal receiver communicatively coupled with the audio signal emitter for receiving audio signals from other participating device, a proximity detector communicatively coupled with the audio signal receiver for detecting the proximity level of the other participating devices, a frequency of the signal received, and a quality of the hardware, a frequency selector communicatively coupled with the proximity detector for selecting a set of frequencies based on the proximity level detected by the proximity detector, and a private key decryptor for decrypting the information in the data transacted between the participating devices.

According to an embodiment herein, the audio signal emitted include the transaction details, and the information about payload data.

According to an embodiment herein, the anti-duplication frequencies are either audible frequencies or inaudible frequencies. Further, According to an embodiment herein, the audio signals are emitted for establishing a secure channel for executing a financial transaction.

According to an embodiment herein, one set of the frequency is selected from a 32 sets of frequencies provided by the application for transmitting and receiving the audio signals, and the frequencies are selected based on the use case scenarios and machine learning algorithm used.

The various embodiments herein provide a method for establishing a data communication through a secure channel using audio signals, according to an embodiment herein, the method comprising the steps of registering a plurality of users to an application server, initiating the application by a registered user, emitting audio signals in anti-duplication frequencies using the audio signal emitter to establish a secure channel with the other participating devices, receiving audio signals from the other participating devices, validating the other participating device using a validating module, detecting the proximity of the other participating device using a proximity detector, establishing a secure channel between the participating devices, and enabling financial transaction between the participating devices.

According to an embodiment herein, a step of registering the plurality of users to the application include receiving user name, user identity, user password, device identity, location details, currency of the location, and access to third-party information, and the plurality of users are registered through a registration module.

According to an embodiment herein, the user details are stored in a user database.

According to an embodiment herein, the application is initiated using the participating device that is hosting the application, and initiating the application refers to the user entering the transaction details.

According to an embodiment herein, the audio signals emitted are anti-duplication signals and the audio signals are emitted in anti-duplication frequencies. Further, the anti-duplication frequencies are the frequencies that are different from the frequencies used for transmitting the payload data.

According to an embodiment herein, the received audio signals are in anti-duplication frequencies, and the received audio signals include the transaction data, payload data, and the hardware information about the other participating device.

According to an embodiment herein, the validating module is configured to validate the participating device using a native application or a third party application.

According to an embodiment herein, the proximity detector is configured to determine the distance between the participating devices involved in the financial transaction. The proximity detector detects the distance between the participating devices when the participating devices are with the range of 0-10 meters.

According to an embodiment herein, the financial transaction is enabled by transmitting the payload data in the secure channel and the payload data is transmitted using the audio signal.

According to an embodiment herein, the participating users are notified after the establishment of the financial transaction.

According to an embodiment herein, the participating device is selected from a group consisting of mobile phones, smart phones, desktop computers, laptop computers, virtual reality devices, palmtop computers, wearable devices, and point of sale (POS) devices.

According to an embodiment herein, the application is run in the background and manage the transmitting and receiving capabilities of the participating device.

According to an embodiment herein, when the user brings the first participating device near to the participating device receiving the payment (POS machine), the application is activated automatically for sending the payment instruction on the first participating device, allowing an invisible payment experience for the users.

According to an embodiment herein, a notification is pushed to a third-party server for completing the transaction when the second participating device receives the payload data from the first participating device through the secure audio channel. The examples of the third-party server include, but are not limited to a remote server, a financial institution linked to the first participating device, a financial institution linked to the second participating device, an independent third-party financial institution, and the like.

Figure 1:
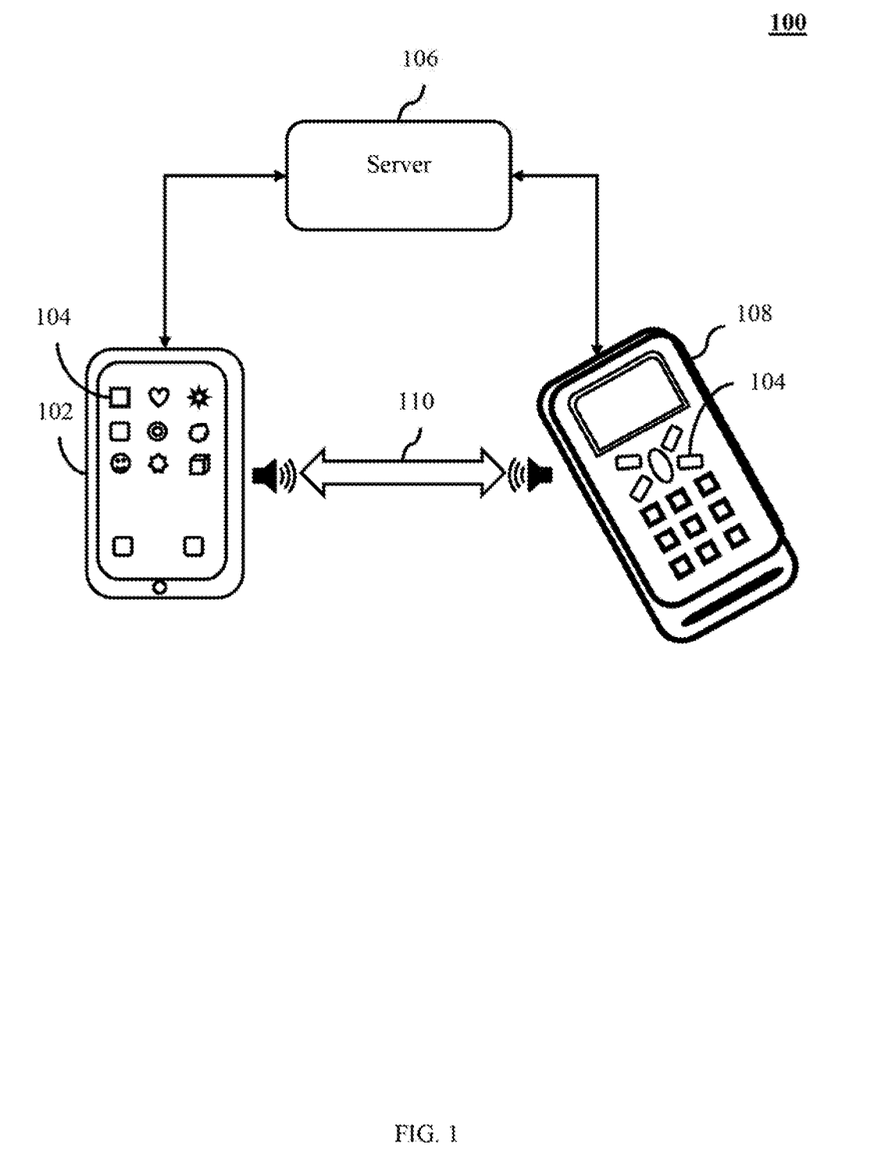
FIG. 1 illustrates a block diagram of a system for establishing data communication between the plurality of participating devices through audio signals, according to an embodiment herein.

FIG. 1 illustrates a block diagram of a system for establishing a data communication between a plurality of computing devices through audio signals emitted in anti-duplication frequencies, according to an embodiment herein. With respect to FIG. 1, the system includes the first participating device 102, the second participating device 108, the application server 106, the communication channel 110, and the application 104 hosted on the first participating device 104 and the second participating device 108.

According to an embodiment herein, a data communication between the first participating device 102 and the second participating device 108 is established. The data communication is established for carrying out a financial transaction. According to an embodiment herein, the first participating device 102 is a customer device, and the second participating device 108 is a vendor device or a Point of Sale (POS) device. The first participating device 102 makes a payment to the second participating device 108 through audio signals. The audio signals are transmitted using the secure communication channel 110.

According to an embodiment herein, the first participating device 102 and the second participating device 108 are computing devices. The examples of the first participating device 102 and the second participating device 108 include, but are not limited to mobile phone, smart-phones, laptops, desktops, palmtops, wearable devices, Personal Digital Assistants (PDAs), vending machines, Near Field Communication (NFC) devices, card readers, Point of sale (POS) devices, virtual reality devices, and the like.

According to an embodiment herein, the first participating device 102, and the second participating device 108 includes in-built speakers to listen and amplify the audio signals emitted by other devices. According to art embodiment herein, the first participating device 102 and the second participating device 108 have in-built microphones to play the audio signals. According to an embodiment herein, the first participating device 102 and the second participating device 108 have both in-built speakers and microphones. According to an embodiment herein, the first participating device 102 includes only in-built speaker or a buzzer along with other standard components of a computing device. According to an embodiment herein, the second participating device 108 includes only a microphone along with other components of a standard computing device. According to an embodiment herein, the first participating device 102 and the second participating device 108 is provided with an option to extend and upgrade the capabilities of the microphone and the speakers to reduce the errors during the financial transaction.

With respect to FIG. 1, the first participating device 102 and the second participating device 108 includes the application 104. The application 104 is hosted on the first participating device 102 and the second participating device 108. According to an embodiment herein, the application 104 is a mobile application installed from an application market. The examples of the application market include but are not limited to Playstore™, AppStore™, BlackBerry World™, Ovi Store™, Windows Store™, and the like. According to an embodiment herein, the application 104 is hosted as a software package. According to an embodiment herein, the application 104 is a web application that is hosted using the participating device through a communication network.

According to an embodiment herein, the first participating device 102 and the second participating device 108 have similar configurations. According to an embodiment herein, the first participating device 102 and the second participating device 108 have dissimilar configurations. The first participating device 102 and the second participating device 108 establish secure communication channel 110 to perform financial transaction, irrespective of the configurations of the participating devices. According to an embodiment herein, the secure channel is established when the distance between the participating devices are less than or equal to 0-10 meters.

With respect to FIG. 1, the server 106 is the application server. The application server 106 establishes the data communication between the first participating device 102 and the second participating device 106. The users are registered to the application server 106 through the application 104 to establish a data communication between the first participating device 102 and the second participating device 106. According to an embodiment herein, the step of registration of the users include but are not limited to providing login credentials, filling the mobile wallet, providing location details, providing the currency type, receiving private key and the like. The users are registered to the application server 106 through the application 104 hosted on the participating devices.

One of the registered users of the participating devices initiates the application 104 to enable a financial transaction between the first participating device 102 and the second participating device 108. For example, when the first participating device 102 transfers a data for the second participating device 108, the registered user of the first participating device 102 initiates the application 104. When the application 104 is initiated, the audio signals are emitted from the first participating device 102 in anti-duplication frequencies. The second participating device 108 receives the audio signals emitted by the first participating device 102 and acknowledges the reception. According to an embodiment herein, the second participating device 108 acknowledges the reception by emitting the audio signals in anti-duplication frequencies. The anti-duplication signals are the audio signals emitted in anti-duplication frequencies. According to an embodiment herein, the anti-duplication frequencies are the frequencies different from the frequencies used for transmitting the payload data.

The first participating device 102 receives the audio signals in anti-duplication frequencies. Further, the first participating device 102 detects the proximity of the second participating device 108. Based on the proximity detected, the first participating device 102 initiates the establishment of the secure channel 110. According to an embodiment herein, the secure channel 110 is an audio channel. The secure channel 110 has several ranges of frequencies and a frequency is selected based on the proximity detected by the first participating device 102. Further, the second participating device 108 receives the secure channel request from the first participating device 102 and completes the establishment of the secure channel 110. The second participating device 108 also emits audio signals in anti-duplication frequencies to complete the establishment of the secure channel 110.

According to an embodiment herein, the second participating device 108 provides the details of the transaction to be carried out, while completing the establishment of the secure channel 110. The first participating device 102 initiates the transaction using the application 104. The transaction is initiated after receiving the transaction details from the second participating device 108. The first participating device 102 transfers the details of the amount to be transferred in the form of audio signals. The details of the amount to be transferred is encoded in the form of audio signals. The second participating device 108 receives the encoded audio signals, decodes the audio signals, and validates the financial transactions. According to an embodiment herein, the second participating device 108 validates the transaction by confirming the money withdrawal from the account of the first participating device 102. According to an embodiment herein, the second participating device 108 validates the transaction by printing a transaction receipt.

According to an embodiment herein, 102 the transaction is completed using other protocols such as internet, Bluetooth Low Energy, Wi-Fi, and the like, when the details of account information is obtained from the first participating device.

When the transaction is completed, the first participating device 102 and the second participating device 108 update the application server 106 through the application 104.

According to an embodiment herein, when the user brings the first participating device 102 near to the second participating device 108, the application 104 is activated automatically on the first participating device 102 for sending the payment instruction. The automatic activation of the application 104 on the first participating device 102 allows the users to have invisible payment experience.

According to an embodiment herein, a notification is pushed to a third-party server for completing the transaction when the second participating device receives the payload data from the first participating device through the secure audio channel. The examples of the third-party server include, but are not limited to a remote server, a financial institution linked to the first participating device, a financial institution linked to the second participating device, an independent third-party financial institution, and the like.

Figure 2:
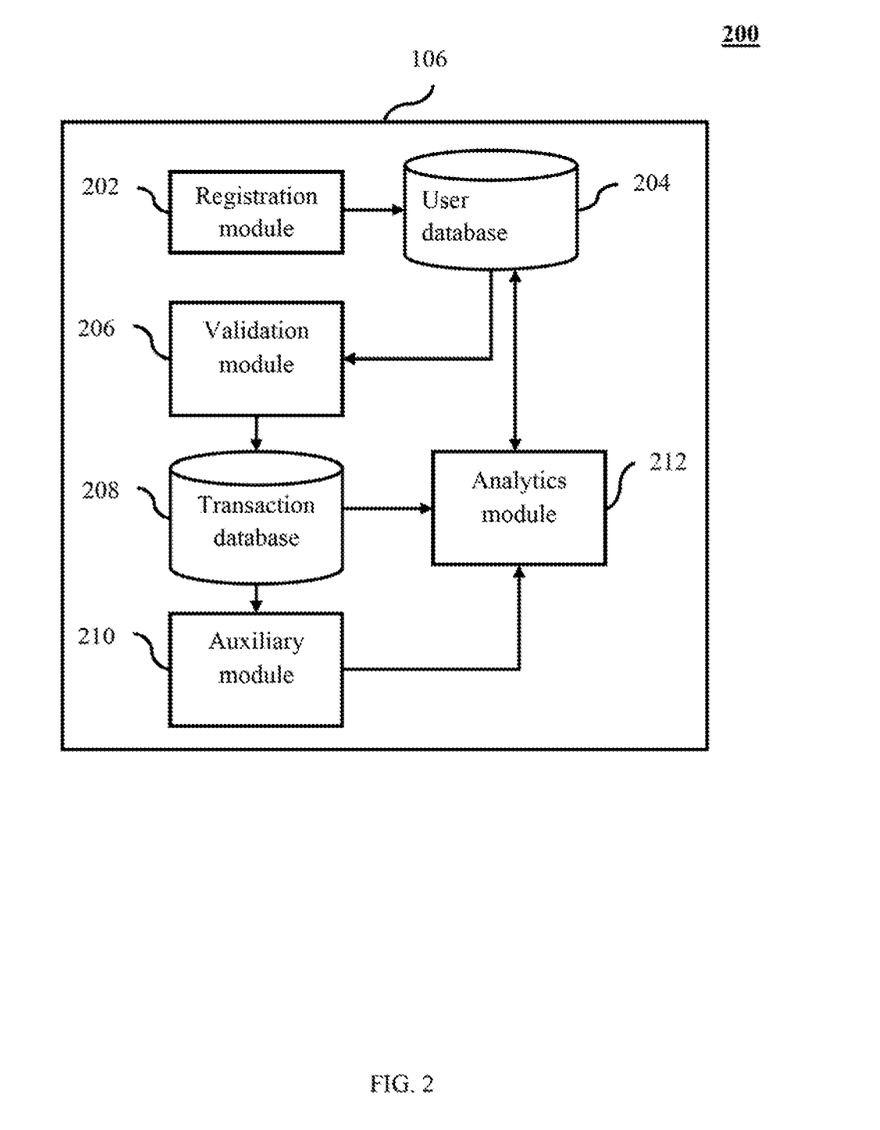
FIG. 2 illustrates a block diagram of an application server, in a system for establishing data communication between the plurality of participating devices through audio signals, according to an embodiment herein.

FIG. 2 illustrates a block diagram of an application server, according to an embodiment herein. With respect to FIG. 2, the server includes a registration module 202. The registration module 202 is configured for registering a user to enable a financial transaction through the audio signals. According to an embodiment herein, the users of the participating devices submits the user credentials for registering with the application server. According to an embodiment herein, the registration module 202 receives a plurality of the details from the participating devices.

The plurality of the details include, but are not limited to user name, user email id, user phone number, user location, type of currency, and the like. According to an embodiment herein, the registration module 202 receives the details of the account from which the financial transactions are enabled. According to an embodiment herein, the account details are directly linked to the application server 106. According to an embodiment herein, the account details are linked to the application server 106 through a third party service such as a mobile wallet, e-wallet, google wallet and the like.

With respect to FIG. 2, the application server includes user database 204. The user database 204 stores the details of the registered users. The details stored in the user database 204 include, but are not limited to, user name, user phone number, user id, email id, number of times the user has used the application 104, user location, user history, user metadata and the like. According to an embodiment herein, the user database 204 resides in the application server 106. According to an embodiment herein, the user database 204 resides in a remote location, but is virtually connected to the application server 106.

The registration module 202 and the user database 204 are communicatively coupled with each other. According to an embodiment herein, the user database 204 stores all the information provided by the registration module 202.

With respect to FIG. 2, the application server includes a validation module 206. The validation module 206 is configured to validate the credentials of the user provided through the participating device. According to an embodiment herein, the credentials validated by the validation module 206 include, but are not limited to user id, password, phone number, account details and the like. The validation module 206 and the user database 204 is communicatively coupled.

According to an embodiment herein, the user details stored in the user database 204 is validated using the validation module 206. According to an embodiment herein, the validation module 206 authenticates the user using a plurality of methods. The plurality of methods include, but are not limited to validating using native resources, validating using third-party applications and the like.

With respect to FIG. 2, the application server includes the transaction database 208. According to an embodiment herein, the transaction database 208 includes the details of the transactions made by the participating devices. According to art embodiment herein, the transaction details include, but are not limited transaction amount, type of transaction, details of the participants of the transactions, and the like.

With respect to FIG. 2, the application server includes the auxiliary module 210. The auxiliary module 210 supports the participating devices through the communication network. The examples of the communication network include, hut are not limited to internet, intranet, local area network (LAN), wide area network, radio communication network and the like.

According to an embodiment herein, the auxiliary module 210 provides support to the registered users. The support provided by the auxiliary module 210 include, but are not limited to providing update of the application, providing security patches, replying to the problems reported and individual queries by the registered users, simplifying the transactions, capturing the data from the registered users, establishing secure communication channel, and the like.

With respect to the FIG. 2, the application server includes the analytics module 212. The analytics module 212 is used for analyzing the variety of activities of the registered users and the transaction database. The examples of the activities analyzed by the analytics module 212 include, but are not limited to user activity, statistics of the transactions, type of transactions, support provided by the application, payment method used by the devices, user payment instruments, product and service feedbacks, crashing reports, demographic details, and the like.

According to an embodiment herein, the analytics module 212 is communicatively coupled with the transaction database 208 and the auxiliary module 210. According to an embodiment herein, based on the information provided by the transaction database 208 and the auxiliary module 210, the analytics module 212 analyzes the information. The analyzed information is communicated to the user database 204. The information analyzed by the analytics module 212 is used for plurality of activities such as targeted advertisements, providing data to third party services, and the like.

Figure 3:
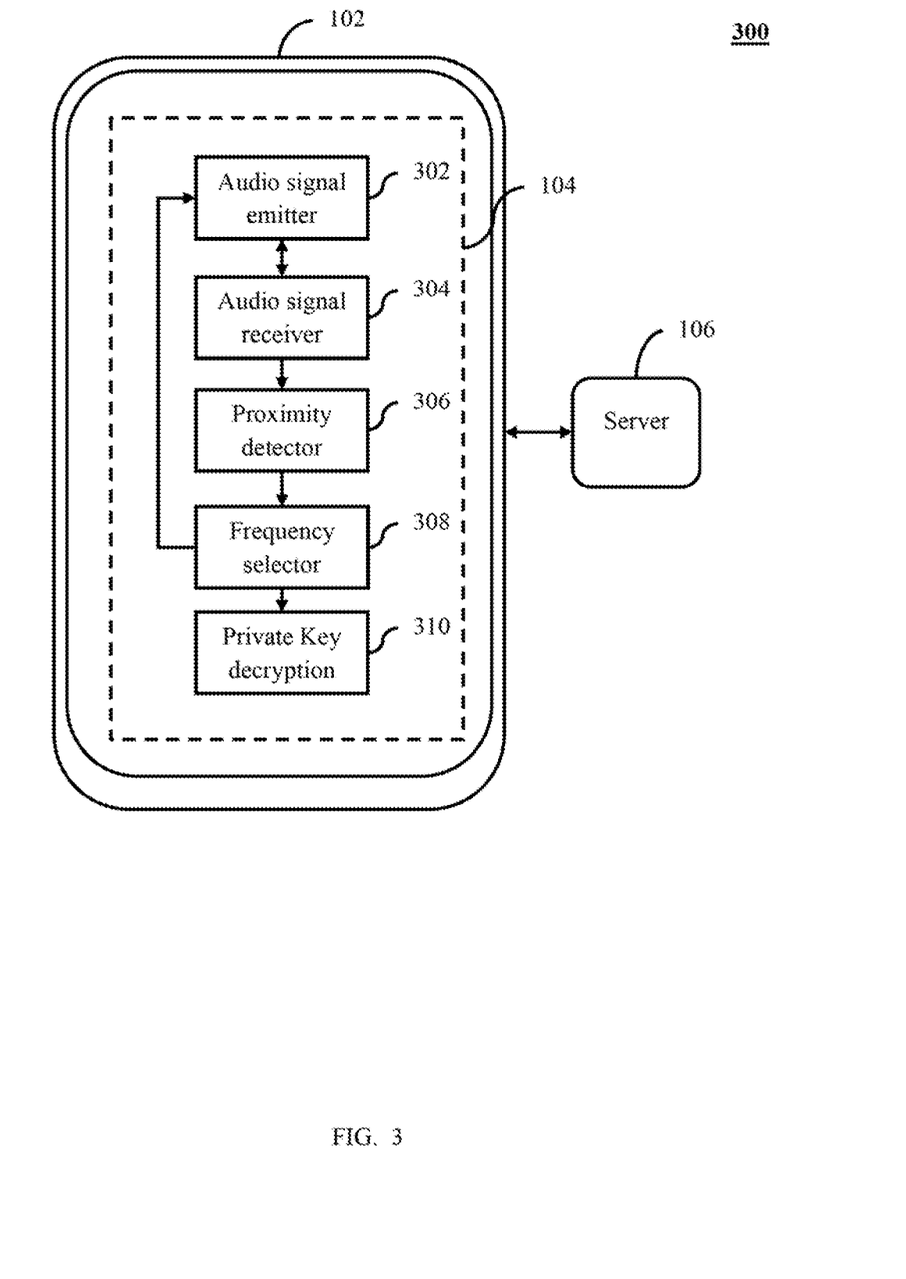
FIG. 3 illustrates a block diagram of a device for establishing a data transfer through audio signals, according an embodiment herein.

FIG. 3 illustrates a block diagram of a device for enabling data transfer through audio signals, according an embodiment herein. With respect to FIG. 3, the device 102 is a customer device. The customer device 102 hosts the application 104 for enabling financial transaction. With respect to FIG. 3, the application includes the audio signal emitter 302. The audio signal emitter starts emitting audio signals, when the user initiates the application 104. According to an embodiment herein, the audio signal is emitted in a range of inaudible range of frequencies. According to an embodiment herein, the audio signal is emitted in a range of audible range of frequencies. The audio signals are emitted using the speaker of the participating device 102. The audio signals are provided by the application 104.

With respect to FIG. 3, the participating device 102 includes the audio signal receiver 304. The audio signal receiver 304 receives the audio signals emitted by the other participating device to establish secure communication and the enable financial transaction. The audio signal receiver 304 of the first participating device 102 receives the signal emitted by other device through the microphone. According to an embodiment herein, the audio signal received by the first participating device 102 comprises anti-duplication frequencies. Further, the audio signal receiver 304 receives the audio signals emitted within the range of 0-10 meters.

According to an embodiment herein, the audio signals received by the audio receiver 304 comprises the data that identifies the vendor device and vendor information. The anti-duplication frequencies emitted in the form of audio signals by the second participating device include Mode Indicator (MI), Customer Mode Indicator (CMI), and key data. According to an embodiment herein, the anti-duplication frequencies are the frequencies that are different from transmitting the payload data. According to an embodiment herein, the Mode Indicator (MI) is used for identifying the participating device as a valid device. According to an embodiment herein, each of the participating devices has a unique mode indicator. The mode indicator is the unique identity through which the other devices recognize and identify the corresponding participating devices. The Customer Mode Indicator (CMI) is used for enabling third participating device to use the provided mode indicator data, while sending the payload data.

According to an embodiment herein, the CMI is based on the amount to be transacted by the first participating device to the second participating device. According to an embodiment herein, the second participating device enters the amount to be transferred from the first participating device. Further, the audio signals received by the audio signal receiver 304 includes a key data. According to an embodiment herein, the key data is a dynamic data in the form of public key that is valid either for a single transaction or for multiple transactions.

With respect to FIG. 3, the device includes a proximity detector 306. The proximity detector 306 senses the proximity of the received audio signal from the second participating device. According to an embodiment herein, the proximity is detected based on the frequencies emitted by the second participating device. Further, the proximity detector 306 detects the quality of the audio signals emitted by the second participating device.

With respect to FIG. 3, the device includes the frequency selector 308. The frequency selector 308 chooses the frequency of the audio signal to be emitted to establish a secure channel. According to an embodiment herein, the frequencies are selected based on the proximity level detected and the quality of the audio signals received by the first participating device. According to an embodiment herein, the frequency is selected by comparing the received frequency with the set of pre-determined frequencies. The set of pre-determined frequencies are frequencies already used in case-scenarios, to ensure establishment of secure channel for enabling the financial transactions. Once the frequency selector 308 chooses the frequency, the first participating device 102 emits the selected audio frequency. According to an embodiment herein, the frequency selector 308 applies filters to establish the secure channel for carrying out financial transaction.

With respect to FIG. 3, the device includes a private key decryptor 310. The private key decryptor 310 is configured to decrypt the acknowledgement received by second participating device (vendor device) and notifies the user about the amount deducted from the account or from the third party mobile wallet.

According to an embodiment herein, the audio signal emitter 302 is communicatively coupled with the audio signal receiver 304. According to an embodiment herein, the audio signal emitter 302 emits the audio signal in the range of 0-32000 dB. According to an embodiment herein, the audio signal emitter 302 first emits the audio signals and then starts receiving the audio signals from second participating device. According to an embodiment herein, the first participating device 102 first receives the audio signals through the audio signal receiver 304, and then emits the audio signals through the audio signal emitter 302.

The audio signal receiver 304 is coupled with the proximity detector 306 that detects the proximity and the quality of the audio signals emitted by the second participating device. Further, the proximity detector 308 is coupled with the frequency selector 308 which selects the appropriate frequency at which the secure channel is established. Further, the frequency selector 308 is communicatively coupled with the private key decryptor 310 to decrypt the information about the transaction between the two devices.

Further, the first participating device 102 is communicatively coupled with the application server 106. The first participating device updates information about the transaction between the participating devices to the application server 106. According to an embodiment herein, the application server 106 is compulsorily required for establishing a transaction between the first participating device and the second participating device. According to an embodiment herein, the application server 106 is not required for establishing transaction between the first participating device and the second participating device. The participating devices update the application server 106 when connected to the communication networks.

Figure 4:
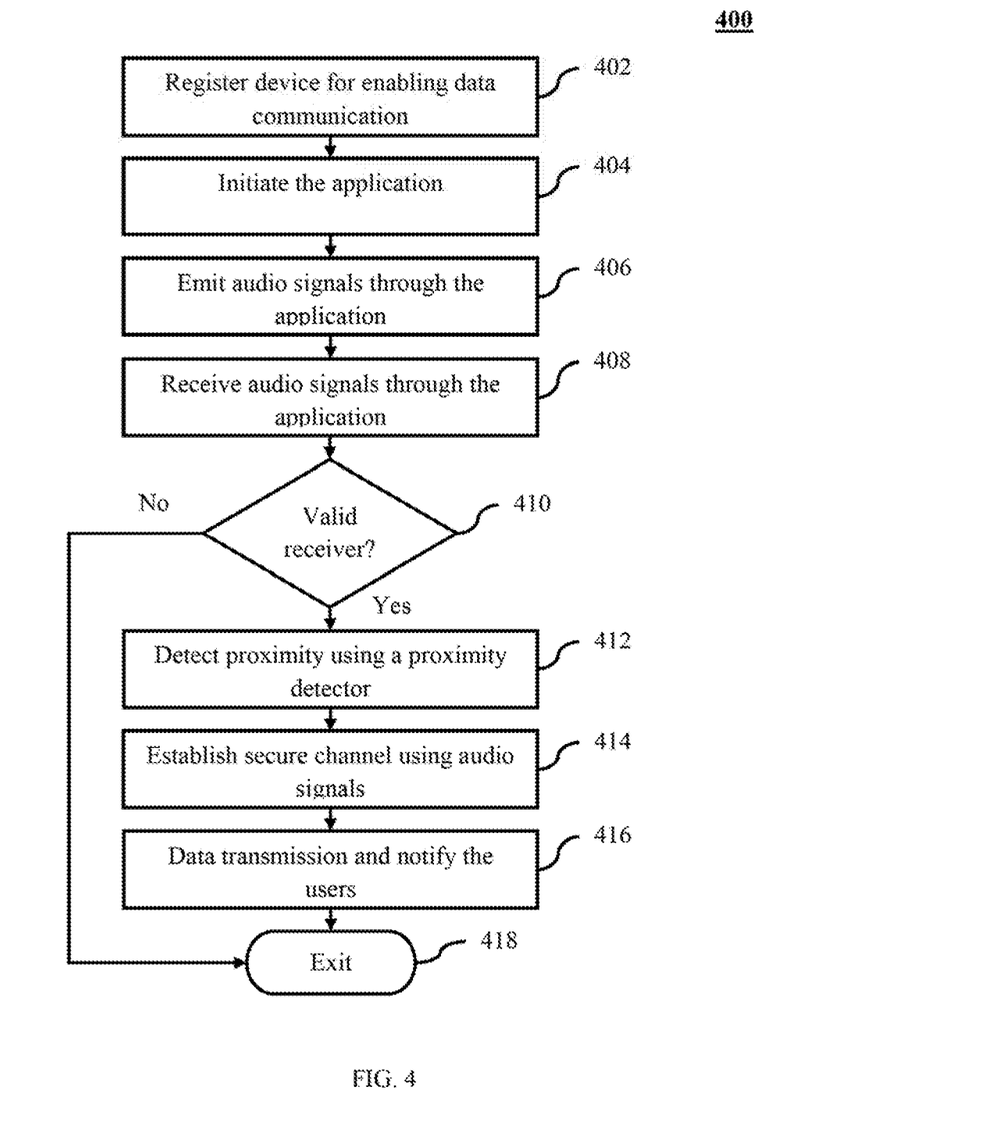
FIG. 4 illustrates a flowchart explaining a method for establishing a data communication between devices through audio signals, according an embodiment herein.

FIG. 4 illustrates a flowchart explaining a method for enabling data communication between devices through audio signals according an embodiment herein. According to an embodiment herein, the participating computing devices are registered with the application server to enable a data communication between the computing devices through a secure channel using audio signals in anti-duplication frequencies. (Step 402). The participating computing devices are registered through the application hosted by the participating computing devices. According to an embodiment herein, the user of the participating computing devices provides a plurality of details to the application server while registering the computing device.

The plurality of the details include, but are not limited to user name, user id, user email address, user phone number, location details, device id, type of currency, the account number, and the like. According to an embodiment herein, the user provides hardware information of the computing device and the configuration of the user device. By providing the hardware details of the participating computing device during the process of registration, the application server is enabled or configured to determine the types of the hardware and provide support accordingly.

According to an embodiment herein, the user is registered as a customer. According to an embodiment herein, the user is registered as a vendor. According to an embodiment herein, the user is registered both as the customer and the vendor. Further, the user provides the account information to enable the financial transaction. The user provides the actual account information from where the money has to be credited and debited. According to an embodiment herein, the user provides the information through a third-party service such as mobile wallet, e-wallet, google wallet, and the like.

When the user is registered to the application portal, the user is permitted to execute a transaction between the participating computing devices. To enable the transaction, the user of the participating device initiates the application (Step 404). According to an embodiment herein, the customer of the transaction initiates the application. According to an embodiment herein, the vendor of the transaction initiates the application. According to an embodiment herein, both the customer and the vendor initiate the application hosted on their respective devices. According to an embodiment herein, the application is initiated by selecting the application option. The application is initiated automatically, when the application is integrated with the operating system of the participating device. According to an embodiment herein, the user provides the information about the money that has to be credited or debited from his account.

Further, once the application is initiated, the participating device starts emitting audio signals in anti-duplication frequencies (Step 406). According to an embodiment herein, the audio signals include the information about the financial details. According to an embodiment herein, the anti-duplication frequencies are the frequencies that are different from the frequencies used for transmitting financial details. The audio signals include the hardware and software information about the participating device.

Further, the first participating device receives the audio signals emitted by the second participating device (Step 408). According to an embodiment herein, the received audio signals include information about the second participating device. The information about the second participating device include, but are not limited to frequency of the emitted audio signal, hardware quality of the second participating device, payload data, and the like.

According to an embodiment herein, the audio signals includes the customer indicator (CI) data to indicate that second participating device is a valid receiver, customer mode indicator (CMI) data to indicate the transaction details, and an optional key data. According to an embodiment herein, the key data is a dynamic data in the form of a public key that is valid either for a single transaction or for multiple transactions.

Further, the first participating device checks for the validation of the second participating device (Step 408). The validation of the second participating device is done in a plurality of ways. According to an embodiment herein, the validation of the second participating device is performed based on the audio signals received by the first participating device. The second participating device is validated based on the registration of the second participating device with the application server. When the second participating device is not validated, then the application exits and the user is notified with the non-establishment of the secure channel to carry out financial transaction When the second participating device is validated, the first participating device detects the proximity of the second participating device (Step 410). The proximity detector in the first participating device detects the proximity of the second participating device based on the frequencies emitted by the second participating device. The second participating device also detects the proximity of the first participating based on the audio signals emitted by the first participating device.

When the proximity between the participating devices is detected, a secure channel is established (Step 414). According, to an embodiment herein, the secure channel is established using audio signals. The secure channel is established using communication networks. The secure channel is established using Bluetooth Low Energy (BLE), Wi-Fi, and the like.

Further to the establishment of the secure channel, the data is transmitted from the first participating device to the second participating device (Step 416). The data is transmitted based on the various factors such as proximity, quality of the hardware, sound level and the like. According to an embodiment herein, the first participating device and the second participating device captures the device capabilities of the participating devices and ensures that at least one of the devices listens or possess microphone. Based on the captured device capabilities, the data transmission is carried out using other available protocols such as Wi-Fi, internet, BLE, and the like to complete transaction.

According to an embodiment herein, the user of the participating device identifies another proximate participating device in a financial transaction, and provides an encrypted payment data. According to an embodiment herein, when the receiving device accepts the payment data on the device, a notification and the payment information is transmitted to a third-party server that completes the transaction. According to an embodiment herein, the examples of the third-party server include, but are not limited to a remote server, a payer's bank, a payee's bank, a third-party financial institution.

Once the transaction is complete, the participating devices and the application server are notified. After the notification, the application exits from the current session (Step 418). According to an embodiment herein, the communication mode to transmit notification of the payment data and the payment information is through audio signals. Further, to provide privacy and security, a authentication method such as PIN could be used.

According to an embodiment herein, the application exits from the current session, when the application server does not validate either of the participating devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not if limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person killed in the art to practice the invention with modifications. However, all such modifications are deemed to be within the scope of the claims.

What is claimed is:

1. A system stored with instructions that are executed on a hardware processor and configured for enabling secure data transfer between participating computing devices through audio signals using one or more applications or algorithms, the system comprising:
    an application server;
    a plurality of computing devices for registering with the application server through an application or algorithm, and wherein the plurality of computing devices are loaded with an application for enabling the plurality of users to register with the application server; and
    a communication network for establishing communication between the application server and the plurality of computing devices registered on the application network through an application or algorithm, and wherein the communication is established to complete a financial transaction between the participating computing devices through an application or algorithm;
    wherein the plurality of computing devices hosting the application comprises;
    an audio signal emitter configured for emitting audio signals in anti-duplication frequencies through an application or algorithm, wherein the audio signal emitted includes transaction details, and the information about payload data, and wherein the anti-duplication frequencies are either of audible frequencies and inaudible frequencies, and wherein the anti-duplication frequencies are frequencies other than the frequencies used for transmitting transaction details, and wherein the audio signals are emitted for establishing secure channel and enable financial transactions;
    an audio signal receiver communicatively coupled with the audio signal emitter and configured for receiving the audio signals from other participating computing devices through an application or algorithm, and wherein the audio signals are anti-duplication signals, and wherein the anti-duplication signals are audio-signals emitted in anti-duplication frequencies, wherein the audio signal received includes the transaction details, and the information about payload data, a device type and hardware quality, and wherein the anti-duplication frequencies are either of audible frequencies and inaudible frequencies, and wherein the audio signals are received for establishing a secure channel and enable financial transactions;
    a proximity detector communicatively coupled with the audio signal receiver and configured for detecting the proximity of the other participating computing devices through an application or algorithm, a frequency of the signal received, and quality of the hardware;

a frequency selector communicatively coupled with the proximity detector, and configured for selecting a set of frequencies based on the proximity detected by the proximity detector through an application or algorithm, and wherein one set of frequency is selected from a 32 set of frequencies provided by the application, and wherein the frequencies are selected based on a use case scenario and machine learning algorithm; and wherein the participating computing devices comprises a first participating computing device and a second participating computing device, and wherein the first participating computing device is configured to transfer details of an amount to be transferred in a form of audio signals, and wherein the details of the amount to be transferred is encoded in a form of audio signals, and wherein the second participating computing device is configured to receive the encoded audio signals, decode the audio signals, and validate a financial transaction, and wherein the financial transaction is enabled by transmitting the payload data in the secure channel and the payload data is transmitted using the audio signal, and wherein the audio signals includes a customer indicator (CI) data, a customer mode indicator (CMI) data, and an optional key data, and wherein the customer indicator (CI) data indicates that second participating device is a valid receiver, and wherein the customer mode indicator (CMI) data indicates the transaction details, and wherein the optional key data is a dynamic data configured in the form of a public key that is valid either for a single transaction or for multiple transactions, and wherein the user of the participating device identifies another participating device and provides encrypted payment data, and wherein a private key decryptor configured for decrypting an information about a data transacted between the participating computing devices.

2. The system according to claim 1, wherein the application server comprises:

a registration module for registering a plurality of users through the application;

a user database in communication with the registration module, wherein the user database stores the information related to the plurality of users, and wherein the information related to the plurality of users include user identity, device identity, hardware identity, frequency of the device, location of the device, currency of the location, information related to third party services, services subscribed, and account information;

a validating module in communication with the user database, for validating the users, wherein the validation of the users is based on one of the native application and a third-party application;

a transaction database in communication with the validating module for tracking the transactions made by the users through the application;

an auxiliary module in communication with the transaction database to support the plurality of computing devices, wherein the support include technology support, providing software patches, providing updates, and replying to a plurality of queries; and an analytics module communicatively coupled with the auxiliary module, transaction database, and user database to analyze the plurality of transactions and user behavior.

3. The system according to claim 1, wherein the application server is configured to notify the participating users after the completion of the financial transaction.

* * * * *